United States Patent [19]

Jilbert

[11] 3,784,920

[45] Jan. 8, 1974

[54] DIRECT CURRENT AMPLIFIERS

[75] Inventor: Phillip Harvey Jilbert, Tadley, England

[73] Assignee: National Research Development Corporation, London, England

[22] Filed: Oct. 3, 1972

[21] Appl. No.: 294,545

[30] Foreign Application Priority Data

Oct. 18, 1971 Great Britain .................. 48,379/71

[52] U.S. Cl. ................. 328/127, 235/183, 307/229, 328/128

[51] Int. Cl. .......................... G06g 7/18, G06g 7/12

[58] Field of Search ........................... 307/229, 230; 328/127; 333/19; 235/183

[56] References Cited

UNITED STATES PATENTS

| | | | |
|---|---|---|---|
| 2,947,480 | 8/1960 | Hirsch | 235/183 A |
| 3,054,051 | 9/1962 | Hayes | 333/19 X |
| 3,480,769 | 10/1969 | Gilbert | 328/127 X |

*Primary Examiner*—John W. Huckert
*Assistant Examiner*—B. P. Davis
*Attorney*—Cushman, Darby & Cushman

[57] ABSTRACT

A direct current amplifier comprises a low impedance reversing switch having a pair of input terminals for connection to an input source and an integrating circuit connected to the output from said reversing switch. The integrating circuit comprises an amplifier having an integrating capacitor connected between its input and output. A differentiating circuit is connected to the output of the integrating circuit, said differentiating circuit comprising an amplifier having a capacitor in series with its input and a resistor connected between its input and output. Also provided are means for indicating the direct-current output of the differentiating circuit, said indicating means being connected to the output of the differentiating circuit via a second reversing switch; and a waveform generator connected to drive said two reversing switches in synchronism and providing a waveform which causes said switches to conduct synchronously in alternate directions, preferably for substantially equal periods.

10 Claims, 7 Drawing Figures

DIRECT CURRENT AMPLIFIERS

This invention relates to direct-current amplifiers, and has one application in photometers using a solar cell as the light-sensitive detector. Such a photometer has one use, in conjunction with other measuring apparatus, in checking the conversion factor (e.g., in candelas per square meter per milliroentgen per second), of an image intensifier use in a medical X-ray television chain.

As is known, the current produced by a solar cell is a linear function of the light intensity over many decades, provided the cell is operating under short-circuit conditions, i.e., the current measuring amplifier presents a very low impedance to the cell current. Moreover under these conditions, the cell current is substantially drift-free and relatively insensitive to temperature variations.

A disadvantage in using solar cells is that their source impedance is very low. Typical values are about 5–10-$^{k}$/ohms. When measuring low-level light powers, for example at the screen of the aforementioned image intensifier, the cell current may be as low as 1 nA ($10^{-9}$A). Hence the equivalent input voltage to the current-measuring amplifier may be only 5$\mu$V. Assuming that the amplifier output is displayed on a meter, and that the output drift is not to exceed $\pm$ 2 percent at a full scale deflection of 1 nA for a $\pm$ 10°C temperature variation, the drift figure for the amplifier itself must be not greater than 10nV per °C. Such a low drift figure cannot be achieved using an ordinary operational DC-coupled amplifier having a large resistor connected between input and output, such as is frequently used to measure small currents. Even commercially available chopper amplifiers have a drift of typically 0.5 $\mu$V per °C, i.e., 500 nV per °C.

The amplifier the subject of the present invention provides a suitably low input impedance together with the desired low drift. The resulting photometer is highly stable in operation and requires no zero-setting control, only on/off and range-selection switches.

According to the present invention a direct-current amplifier comprises:

a low impedance reversing switch having a pair of input terminals for connection to an input source;

an integrating circuit connected to the output from said reversing switch, said integrating circuit comprising an amplifier having an integrating capacitor connected between its input and output;

a differentiating circuit connected to the output of the integrating circuit, said differentiating circuit comprising an amplifier having a capacitor in series with its input and a resistor connected between its input and output;

means for indicating the direct-current output of the differentiating circuit, said indicating means being connected to the output of the differentiating circuit via a second reversing switch;

and a waveform generator connected to drive said two reversing switches in synchronism and providing a waveform which causes said switches to conduct synchronously in alternate directions, preferably for substantially equal periods.

The low-impedance input reversing switch may comprise four similar (i.e., non-complementary) field-effect transistors (FET's) having their source-to-drain paths connected in a ring, opposite pairs of their gates being connected together and to a balanced output of said waveform generator, one pair of opposite points on the ring constituting said input terminals and the other pair being connected to said integrating circuit.

The second reversing switch may be similar to the input reversing switch.

The integrating circuit may comprise a DC-coupled amplifier having a feedback resistor connected between input and output to stabilise its DC operating conditions, and a DC blocking capacitor connected between its input and said input reversing switch, said feedback resistor and blocking capacitor having relatively high and low impedances respectively at the frequency of the switching waveform, and the input side of said integrating capacitor being connected to the side of said blocking capacitor remote from the amplifier input. A further resistor of relatively high impedance at the switching frequency may be connected in parallel with the blocking capacitor to suppress transient-initiated oscillations.

The waveform generator may provide a balanced square-wave output having positive- and negative-going portions of substantially equal length. The leading and trailing edges of the square waves may have substantially equal slopes, defined to be relatively slow, in order to reduce the injection of transient currents into the integrating circuit.

The waveform generator may comprise means for deriving and squaring a sinusoidal waveform of twice the mains frequency, the defined slopes being those of the derived sinusoidal waveform at its zero cross-over points. The squaring may be effected by a saturating amplifier. The use of a switching waveform having twice the mains frequency prevents common-mode interference of mains frequency being fed to the integrating circuit.

A solar cell, or other input current source, may be connected to the input terminals of the input reversing switch through a pair of inductors to reduce the injection of any externally picked-up transients into the reversing switch.

The output indicating means may be a DC meter.

To enable the nature of the present invention to be more readily understood, attention is directed, by way of example, to the accompanying drawings wherein.

Figure 1:
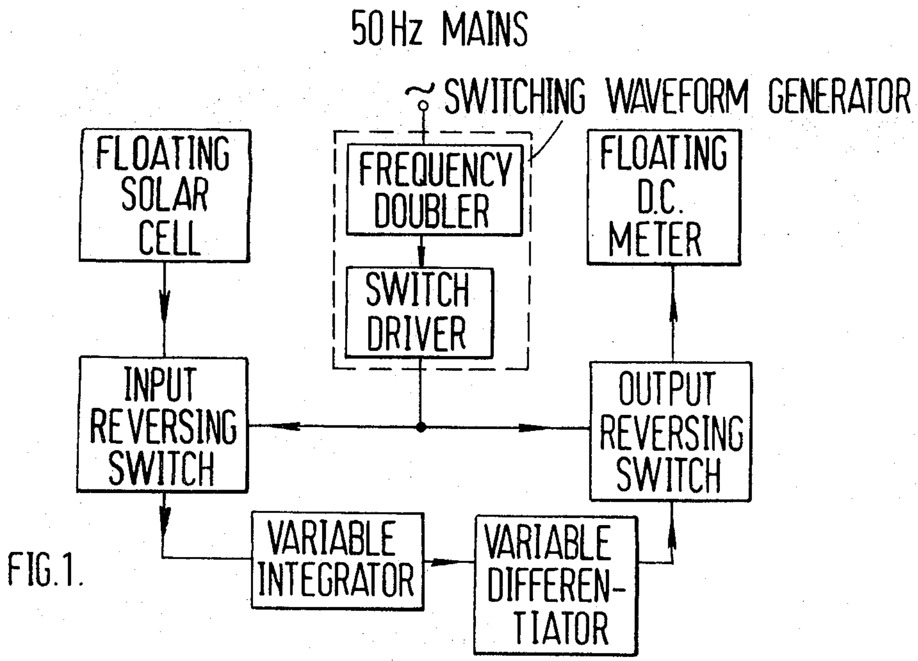
FIG. 1 is a block schematic diagram of a photometer embodying the present invention.

In FIG. 1 the DC current from a solar cell, which is electrically floating (i.e., neither output terminal earthed), is connected to an input reversing switch. The output of the latter is a DC current which reverses direction at the switching frequency of the switch to form a current square-wave having substantially equal-duration and equal-amplitude portions of each polarity. This current square-wave is fed to an integrating circuit, whose output is a substantially symmetrical triangular voltage waveform having a slope which depends on the input current amplitude. The triangular voltage waveform is fed to a differentiating circuit, which converts the triangular waveform back to a square-wave output. This output is fed via an output reversing switch, operated in synchronism with the input reversing switch, to a floating DC output meter. The switching waveform for both reversing switches is generated from the mains by deriving a sinusoidal waveform of twice mains frequency and generating from the latter a balanced square switch-driving waveform having leading and trailing edges of defined slope.

Referring now to FIG. 1 the input reversing switch comprises four FET's T1–T4 (Amelco U 1898E'S) having their source-drain paths connected in a ring. It is immaterial in which direction these paths are individually oriented in the ring. A solar cell 1 (MS11 BE) is connected across two opposite points in the ring through inductors L1 and L2 of 3–4H. The two other opposite points in the ring are connected respectively to earth and to output terminal C. The gates of opposite FET's T1 and T3 are connected to switching terminal A and these of FET's T2 and T4 to switching terminal B. A differential trimming capacitor C1 is connected between each pair of gates and the output connection; its function will be explained later.

A balanced, substantially square, switching waveform of 100 Hz is applied between terminals A and B, alternating between 0V and −7V. When terminal A is at 0V and terminal B at −7V, T1 and T3 conduct the cell current, while T2 and T4 are cut off; the cell being poled as shown, a positive current therefore flows to terminal C during this half-cycle. During the next, equal-duration half-cycle, the voltages on terminals A and B reverse, T2 and T4 conduct, and a similar but negative cell current flows to terminal C.

The output reversing switch comprises a similar ring of FET's T5–T8 also having their opposite pairs of gates connected to the output meter 2 (100 $\mu$A FSD). Of the other two, one is earthed and the other connected to output terminal D. Meter 1 has in parallel a smoothing capacitor C2 (100 $\mu$F) and an overload diode D1 (OA 202).

As will be seen subsequently, the current flowing from terminal D to the output reversing switch consists of half-cycles of equal-amplitude positive and negative current, synchronised with the switching waveform. The latter waveform controls the conduction of T5–T8, as it does of T1–T4, so that T5–T8 act as a phase-sensitive rectifier and the current to meter 2 is unidirectional.

Figure 3:
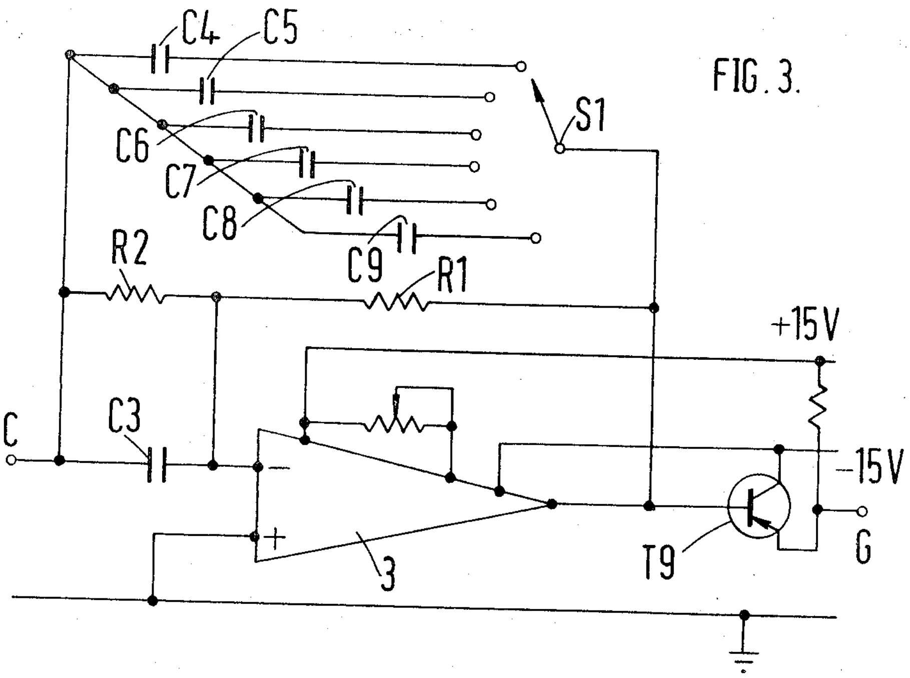
FIG. 3 is a circuit diagram of the integrating circuit in FIG. 1.

As shown in FIG. 3, the input terminal C is connected to an integrating circuit comprising a capacitor C3 in series with one input terminal of a DC-coupled amplifier 3. The latter is of the integrated circuit type (Computing Techniques Ltd. E70) having a gain of about $10^5$ and an input impedance of about $10^{11}$ ohms. The DC operating conditions of amplifier 3 are stabilised by a feedback resistor R1 of $10^{10}$ ohms connected between its input and output. Any of six integrating capacitors C4–C9 is connectable by a switch S1 between input terminal C and the output of amplifier 3. A resistor R2 of $10^7$ ohms is connected across C3. The output of amplifier 3 is taken via an emitter-follower T9 (2N 3702) to a terminal G.

C3 presents a relatively small impedance to the 100 Hz input signal but prevents the relatively low DC resistance of the source, inductors and reversing switch from nullifying the DC stabilising effect of R1. From the same point of view R2, which is provided to suppress oscillations initiated by transients, is equivalent to a high DC source impedance. So far as the 100 Hz input is concerned therefore, the circuit acts as a conventional operational integrator, the voltage across the selected capacitor C4–C9 varying linearly in opposite directions as the current to terminal C changes in polarity. The output at terminal G is therefore a symmetrical triangular waveform having positive- and negative-going portions of substantially equal slope and duration. The duration is fixed by the switching waveform; the slope depends on the value of the selected capacitor. Capacitors C4–C9 have values of 0.000333$\mu$F, 0.001 $\mu$F, 0.01 $\mu$F, 0.1 $\mu$F, 1.0 $\mu$F and 10 $\mu$F respectively in the present embodiment.

Figure 4:
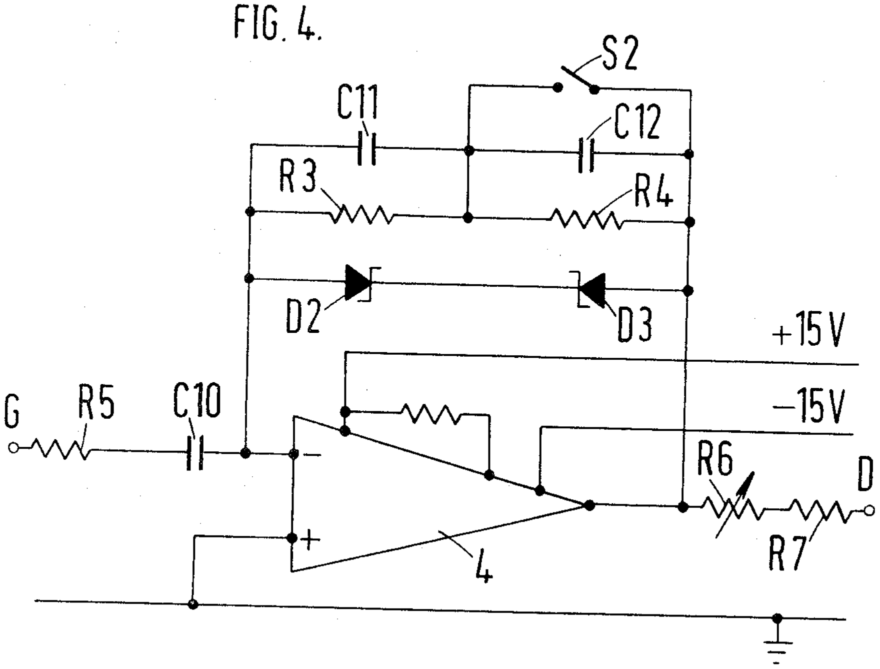
FIG. 4 is a circuit diagram of the differentiating circuit in FIG. 1.

Turning now to FIG. 4 terminal G is connected to a differentiating circuit comprising a differentiating capacitor C10 (1 $\mu$F) in series with an input terminal of a DC-coupled amplifier 4 of the same type as amplifier 3 in FIG. 3. The differentiated voltage is developed in the conventional way across a resistor connected between input and output of amplifier 4. This resistor consists of R3 (100 k ohms) in series with R4 (233.3 k ohms). The latter can be shorted by a switch S2 to give a x3⅓ sensitivity control. A small series input resistor R5 (200 ohms) and small parallel capacitors C11, C12, serve to suppress ringing in a conventional manner. Zener diodes D2 and D3 (CV 7145) provide overload protection.

Figure 2:
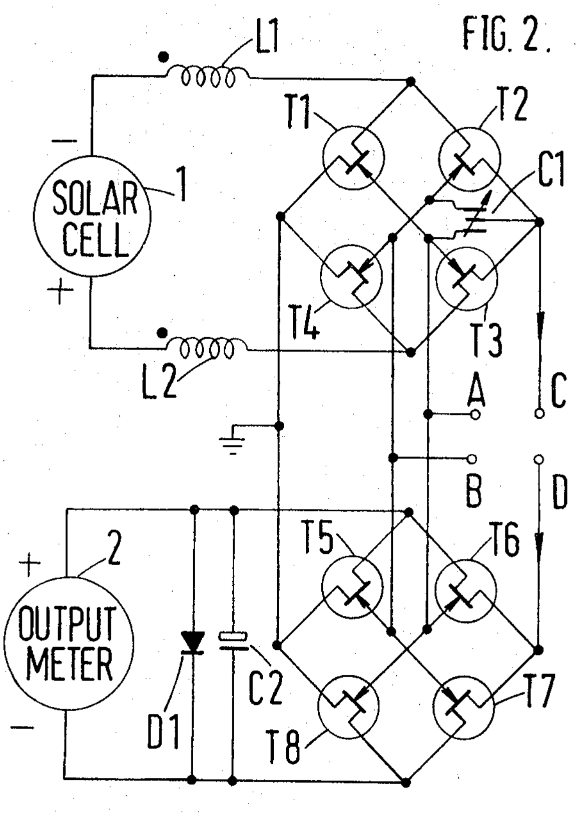
FIG. 2 is a circuit diagram of the input and output reversing switches in FIG. 1 and the connections thereto.

The triangular waveform applied to terminal G is converted by the differentiating circuit to a voltage square-wave which is symmetrical about earth. Its amplitude depends on the slope of the triangular waveform, and hence on the value of the input current from cell 1. The square wave is fed via a variable resistor R6 (10 k ohms) and a fixed resistor R7 (3.3 k ohms) to terminal D of the output reversing switch (FIG. 2.) R6 is normally set so that with S2 closed, full-scale deflection (100$\mu$A) on meter 2 represents the following cell currents with selected integrating capacitors:

C43 nAC71 $\mu$A
C510 nAC810 $\mu$A
C6100 nAC9100 $\mu$A

As in any amplifier system employing input signal modulation followed by phase-sensitive rectification, only the DC input signal is converted back to DC and spurious AC signals are ignored. It is convenient to derive the symmetrical switching waveform from the mains supply, but if the switching waveform were at the 50 Hz mains frequency, any common-mode mains-derived interference signals would also be amplified. This difficulty is overcome in the present embodiment by generating a switching waveform of twice mains frequency, as shown in FIG. 5.

Figure 5:
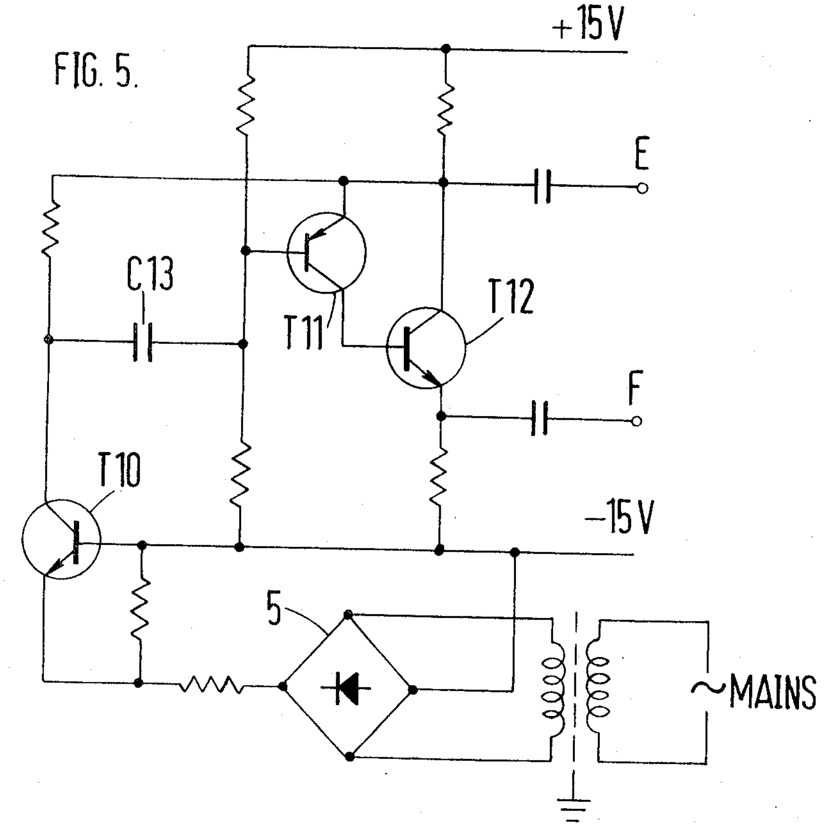
FIG. 5 is a circuit diagram of the frequency doubler circuit of FIG. 1.

In FIG. 5 a 6V RMS 50 Hz input is applied to a full-wave rectifier 5 (Texas 1B 05J40). The unsmoothed output thereof is applied to the emitter-to-base diode of a germanium transistor T10 (2N 1306) which has a square-law characteristic. The collector current of T10 thus consists of a DC and a 100 Hz component. The latter is applied via C13 (0.1 $\mu$F) to the base of transistor T11 (2N 3702) and thence fed to transistor T12 (2N 3702) which is connected in a phase-splitter circuit producing sinusoidal anti-phase outputs at terminals E and F.

Figure 6:
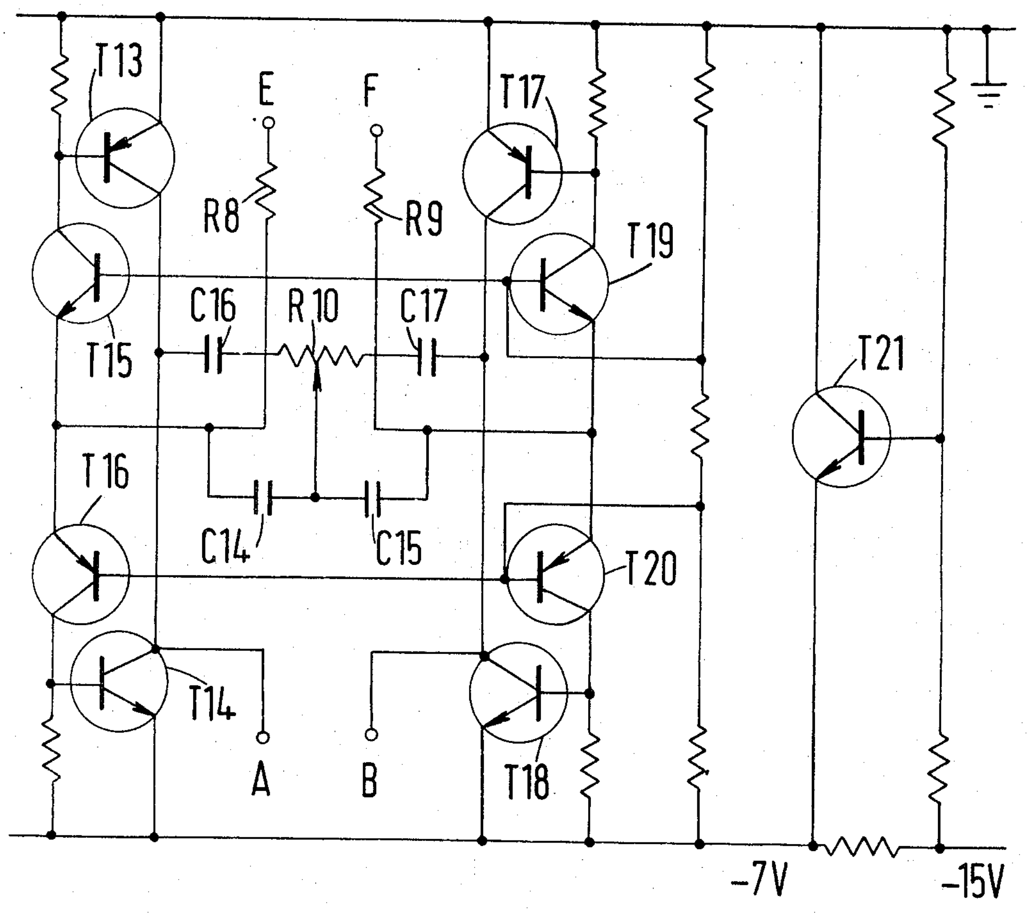
FIG. 6 is a circuit diagram of the switch driver circuit in FIG. 1.

Referring to FIG. 6, terminals E and F are connected to a drive circuit comprising a balanced amplifier. The latter consists of two similar transistor channels, T13–T16 and T17–T20. The emitter-collector paths of T13/T14, and of T17/T18 are in series between earth and a −7V rail maintained by T21 (2N 3704). The emitter-collector paths of T15/T16 and of T19/T20 are connected in series between the bases of the aforementioned pairs of transistors respectively. The balanced inputs are applied to the emitters of T15/T16 and T19/T20 respectively. As these are low-impedance points, resistors R8 and R9 (each of 22 k ohms) are connected in series with the inputs to avoid loading the preceding phase-splitter.

In the absence of an input signal, all the transistors are biased off. A positive input to the T15/T16 emitters brings T16 and hence T14 hard on, while T13 and T15 remain off. Output terminal A therefore falls to −7V. A negative input to the T15/T16 emitters brings T15 and hence T13 hard on, while T16 and T14 remain off. Terminal A therefore rises to 0V. The anti-phase input to the T19/T20 emitters produces a similar but anti-phase output at terminal B.

Figure 7:
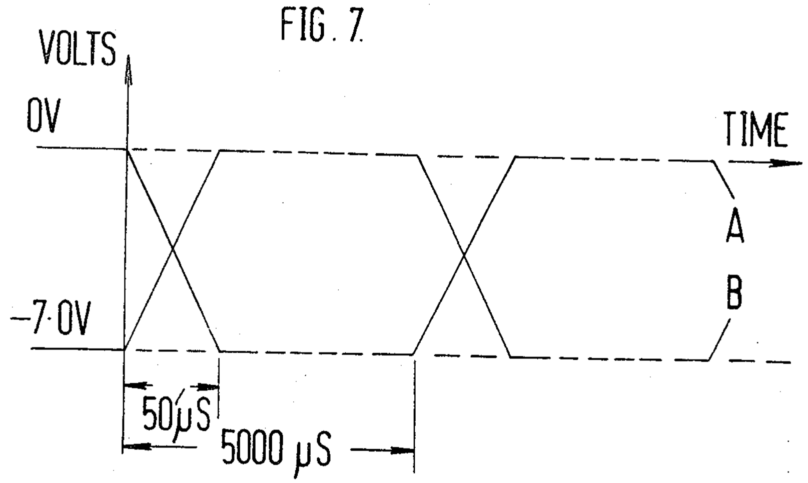
FIG. 7 shows the switching waveform applied to the reversing switches in FIG. 1.

The emitter-to-base diodes of T15, T16, T19 and T20 are saturated by the large sinusoidal input waveforms, resulting in the balanced square output waveform shown in FIG. 7. The slope of the leading and trailing edges is desired from the slope of the sinusoidal waveform at its zero cross-over points, and is here about 50 $\mu$sec in duration. These comparatively slow edges would be difficult to obtain using a multivibrator or similar regenerative circuit.

The desirability of these comparatively slow edges arises from the fact that, especially on the more sensitive ranges, the present form of amplifier is sensitive to any current spikes injected at in integrator input. Such spikes can be introduced by the edges of the switching waveform via the FET interelectrode and stray capacitances of the input reversing switch. During switching, edges of opposite polarities are applied simultaneously to T2 and T3. Hence, despite there being, in effect, 100 Hz common-mode signals, the resulting current spikes are rejected by the current provided they are of equal amplitude and thus cancel each other out. However, the smaller the current spikes, the smaller any differential residuum, and thus a relatively low switching rate and slow edges are desirable.

In order to ensure that the opposite-polarity edges of the switching waveform which appear simultaneously at output terminals A and B have substantially equal and opposite slopes (whereby the resulting current spikes cancel out), FIG. 6 includes the following feedback arrangement.

Two capacitors C16, C17 (each of 1000 pf) are connected in series between the output terminals A and B. Their junction is connected, via a slider on potentiometer R10 (1 k ohm) to the emitters of T15/T16 and T19/T20, i.e., to the amplifier inputs, via capacitors C14 and C15 (each of 1000 pf) respectively. Neglecting R10 for the moment, it will be seen that if the slopes at terminals A and B are equal and opposite, there is no voltage at the junction of C16 and C17. Should they not be equal and opposite, a difference signal appears at this junction and is fed to the two inputs. This difference signal constitutes positive feedback to one input and negative feedback to the other in a sense to render the output slopes equal and opposite. R20 introduces some asymmetry into the feedback to compensate for inequalities in the capacitor values, and also to provide a present zero-setting control for meter 2 by the deliberate introduction of small differential current spikes.

The differential trimming capacitor C1 in FIG. 2 is provided as a further aid in balancing-out current spikes produced by the switching waveform due to unequal inter-electrode and stray capacitances in the reversing switch. L1 and L2 are included to filter out any interference spikes picked up by cell 1.

A simpler reversing switch can be provided by making T1 and T3 one type of FET, and T2 and T4 the complementary type. A single unbalanced switching waveform can then be applied to all four gates in common. However in this case the current spikes due to the switching edges are common-mode 100 Hz signals (unrejected) of alternate polarities which cannot be cancelled out. Hence such a switch is unsuitable for the high-sensitivity ranges.

It is desirable that the switching waveform durations should be substantially the same in each direction, so that the input reversing switch conducts for equal times in both directions. If this is not so, the current fed to the integrating circuit has a mean DC component which builds up a charge on the selected integrating capacitor C4 etc. Because of the presence of C3, the resulting voltage on C4 does not appear at the amplifier output, but opposes the cell emf in one direction and aids it in the other. An equilibrium is reached at which the currents in the two directions differ by the same proportion as do the two durations. This means firstly, that voltages are being applied across the cell which, if allowed to become too great, may spoil its linearity, and secondly, that the triangular integrated output no longer has equal slopes in both directions. Thus although some degree of asymmetry can be tolerated, it is preferred that substantially equal switching periods are used. The latter are readily obtained by defining the periods between the zero cross-over points of a mains-derived sine wave, as in the present embodiment.

The input impedance presented to the cell 1 is made up of the DC resistance of L1 and L2 (about 70 ohms) and of the input reversing switch (about 100 ohms), plus the input impedance of the integrating circuit. The latter can be shown to have an effective maximum value of about 50 ohms on the most sensitive range. The total input impedance is therefore only about 220 ohms maximum.

The equivalent DC input drift of the amplifier 3 is about 120 $\mu$V per °C. Taking account of the DC feedback via R1 and R2, and the gain of $10^5$, the output drift is about 120 mV per °C. However as the subsequent circuits are AC-coupled, this drift does not effect the output displayed on meter 2, which is substantially drift-free.

Although described with reference to its use in measuring currents from a solar cell, the present amplifier can be used in other applications where a low input impedance and low drift are required.

I claim:

1. A direct current amplifier comprising a low impedance reversing switch having a pair of input terminals for connection to an input source; an integrating circuit connected to the output from said reversing switch, said integrating circuit comprising an amplifier having an integrating capacitor connected between its input and output; a differentiating circuit connected to the output of the integrating circuit, said differentiating circuit comprising an amplifier having a capacitor in series with its input and a resistor connected between its input and output; means for indicating the direct-current output of the differentiating circuit, said indicating means being connected to the output of the differentiating circuit via a second reversing switch; and a waveform generator connected to drive said two reversing switches in synchronism and providing a waveform which causes said switches to conduct synchronously in alternate directions, preferably for substantially equal periods.

2. An amplifier as claimed in claim 1 wherein the low-impedance input reversing switch comprises four similar field-effect transistors having their source-to-drain paths connected in a ring, opposite pairs of their gates being connected together and to a balanced output of said waveform generator, one pair of opposite points on the ring constituting said input terminals and the other pair being connected to said integrating circuit.

3. An amplifier as claimed in claim 2 wherein the second reversing switch is similar to the input reversing switch.

4. An amplifier as claimed in claim 3 wherein the integrating circuit comprises a DC-coupled amplifier having a feedback resistor connected between its input and its output to stabilise its DC operating conditions, and a DC blocking capacitor connected between its input and said input reversing switch, said feedback resistor and blocking capacitor having relatively high and low impedances respectively at the frequency of the switching waveform, and the input side of said integrating capacitor being connected to the side of said blocking capacitor remote from the amplifier input.

5. An amplifier as claimed in claim 4 wherein a further resistor of relatively high impedance in the switching frequency is connected in parallel with the blocking capacitor to suppress transient-initiated oscillations.

6. A direct current amplifier comprising a low impedance reversing switch having a pair of input terminals for connection to an input source; an integrating circuit connected to the output from said reversing switch, said integrating circuit comprising an amplifier having an integrating capacitor connected between its input and output; a differentiating circuit connected to the output of the integrating circuit, said differentiating circuit comprising an amplifier having a capacitor in series with its input and a resistor resistor connected between its input and output; means for indicating the direct-current output of the differentiating circuit, said indicating means being connected to the output of the differentiating circuit via a second reversing switch; and a waveform generator connected to drive said two reversing switches in synchronism by providing a waveform which causes said switches to conduct synchronously in alternate directions, the waveform generator being arranged to provide a balanced square wave output having positive- and negative-going portions of substantially equal length, with the leading and trailing edges of the square waves having substantially equal slopes, which are defined to be relatively slow, in order to reduce the injection of transient currents into the integrating circuit.

7. An amplifier as claimed in claim 6 wherein the waveform generator comprises means for deriving and squaring a sinusoidal waveform of twice the mains frequency, the defined slopes being those of the derived sinusoidal waveform at its zero cross-over points.

8. Am amplifier as claimed in claim 7 and comprising a saturated amplifier for effecting the squaring.

9. An amplifier as claimed in claim 8 wherein the low-impedance input reversing switch comprises four similar field-effect transistors having their source-to-drain paths connected in a ring, opposite pairs of their gates being connected together and to a balanced output of said waveform generator, one pair of opposite points on the ring constituting said input terminals and the other pair being connected to said integrating circuit.

10. An amplifier as claimed in claim 9 wherein the integrating circuit comprises a DC-coupled amplifier having a feedback resistor connected between its input and its output to stabilise its DC operating conditions, and a DC blocking capacitor connected between its input and said input reversing switch, said feedback resistor and blocking capacitor having relatively high and low impedances respectively at the frequency of the switching waveform, and the input side of said integrating capacitor being connected to the side of said blocking capacitor remove from the amplifier input.

* * * * *